(12) United States Patent
Kile

(10) Patent No.: US 9,399,369 B1
(45) Date of Patent: *Jul. 26, 2016

(54) LUBRICATING OIL MONITORING AND MAINTENANCE CAP AND METHODS OF INSTALLATION

(71) Applicant: Ronald J. Kile, Rosalia, WA (US)

(72) Inventor: Ronald J. Kile, Rosalia, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/621,277

(22) Filed: Feb. 12, 2015

Related U.S. Application Data

(63) Continuation of application No. 13/487,591, filed on Jun. 4, 2012, now Pat. No. 8,979,215.

(51) Int. Cl.
  *B60B 27/00* (2006.01)
  *B60B 7/00* (2006.01)

(52) U.S. Cl.
  CPC ...................................... *B60B 7/002* (2013.01)

(58) Field of Classification Search
  CPC .......... B60B 7/00; B60B 7/0013; B60B 7/002
  USPC .......... 301/108.1, 108.2, 108.4; 305/100, 117
  See application file for complete search history.

(56) References Cited

U.S. PATENT DOCUMENTS

| | | |
|---|---|---|
| 3,089,738 A | 5/1963 | Steiner |
| 3,177,041 A | 4/1965 | Isenbarger |
| 3,316,022 A | 4/1967 | Isenbarger |
| 3,331,638 A | 7/1967 | Fruth |
| 5,054,859 A | 10/1991 | Goettker |
| 6,758,531 B1 | 7/2004 | Bullard |
| 7,731,300 B2 | 6/2010 | Gerstenslager et al. |
| 8,979,215 B2 * | 3/2015 | Kile ...................... B62D 55/15 301/108.2 |
| 2014/0175861 A1 | 6/2014 | White et al. |

* cited by examiner

*Primary Examiner* — Jason Bellinger
(74) *Attorney, Agent, or Firm* — Michael W. Goltry; Robert A. Parsons; Parsons & Goltry

(57) ABSTRACT

A roller for a tracked vehicle has a lubricating oil reservoir and an open end to the lubricating oil reservoir. The open end of the roller is closed by a cap removably coupled to the open end. The cap includes a sealing body having an outer side facing away from the open end, an opposed inner side facing toward the open end, and a standoff structure formed in the inner side. A compressible gasket is applied between the inner side of the cap and the open end and is under a compression between the inner side of the cap and the open end of the roller forming a fluid-impervious seal between the cap and the open end of the roller. The standoff structure of the cap interacts between the cap and the open end holding the cap away from the open end limiting the compression of the gasket.

5 Claims, 11 Drawing Sheets

LUBRICATING OIL MONITORING AND MAINTENANCE CAP AND METHODS OF INSTALLATION

FIELD OF THE INVENTION

The present invention relates generally to tracked vehicles and, more particularly, to maintenance caps used to cap oil reservoirs of rollers of tracked vehicles.

BACKGROUND OF THE INVENTION

A crawler-type or tracked vehicle is normally supported and propelled by an undercarriage assembly having an endless track entrained about a drive roller or sprocket, a front idler roller, a rear idler roller, and a series of track rollers. The drive roller or sprocket is driven by an engine of the work vehicle which, in turn, causes the endless track to be advanced around each of the front and rear idler rollers as well as the track rollers to advance the work vehicle.

For an endless track to function properly, it must be properly tensioned around the several rollers, and the several rollers must be properly maintained to ensure they roll with the least amount of friction while supporting the weight of the vehicle. Tracked vehicles are normally considerably heavy. As a result, the rollers are prone to generate substantial frictional heat as they are made to roll as the tracked vehicle advances. Excessive frictional heat in the rollers can lead to roller failure and expensive and time-consuming repair costs. Limiting frictional heat in rollers is accomplished with a lubricating oil, which is applied to and maintained by lubricating oil reservoirs formed in the rollers. The lubricating oil must be periodically replenished, and periodically replaced to ensure the oil functions properly, namely, that it reduces roller friction and draws and dissipates heat away from the rollers. Contaminated or dirty oil and reduced oil levels impede the ability of the oil to reduce friction and dissipate heat. Accordingly, proper oil maintenance in rollers is essential for proper operation of the tracked vehicle and to limit unnecessary and time-consuming roller repairs.

The rollers of tracked vehicles are often fashioned with caps that close the open ends of the rollers that lead to the lubricating oil reservoirs. These caps are removably coupled to the rollers, such as with bolts, and provide trained workers to convenient access to the lubricating oil reservoirs for facilitating the replenishment and replacement of the lubricating oil in the lubricating reservoirs. It is essential that a reliable and durable fluid-impervious seal be formed between the caps and the open ends of the rollers to prevent unnecessary leaking past the applied caps. This fluid impervious seal is normally accomplished with sealing gaskets applied between the caps and the open ends of the rollers. However, it has been noticed that workers tend to over-tighten the bolts that secure the caps to the open ends of the rollers, which over-compresses the sealing gaskets crushing them to the point of failure or to the point to cause premature failure, thus necessitating further improvement in the art.

SUMMARY OF THE INVENTION

According to the principle of the invention, a roller for a tracked vehicle has a lubricating oil reservoir and an open end to the lubricating oil reservoir. The open end of the roller is closed by a cap removably coupled to the open end. The cap consists of a sealing body having an outer side facing away from the open end, an opposed inner side facing toward the open end, and a standoff structure formed in the inner side. A compressible gasket is applied between the inner side of the cap and the open end and is under a compression between the inner side of the cap and the open end of the roller forming a fluid-impervious seal between the cap and the open end of the roller. The standoff structure of the cap interacts between the cap and the open end holding the cap away from the open end limiting the compression of the gasket between the cap and the open end preventing an over-compression of the cap sufficient to damage the gasket or otherwise render the gasket inoperative for its intended purpose which is to form a reliable, fluid-impervious seal between the cap and the open end of the roller that does not quickly wear out and that yields utility over time. The standoff structure includes standoff prominences each being in direct contact with the open end of the roller. The gasket has a length and the standoff prominences are equal in size and are equally spaced-apart along the length of the gasket forming an equally spaced-apart standoff distribution along the length of the gasket. The cap is secured to the open end of the lubricating oil reservoir with fasteners. The fasteners are preferably bolts that are threadably applied to the open end of the roller through holes formed through the cap and also through the standoff prominences of the cap. In a further embodiment, the standoff structure includes a continuous, perimetric prominence in direct, continuous contact with the open end of the roller. The gasket is located inside of, and is encircled by, the continuous, perimetric prominence.

According to the principle of the invention, a roller for a tracked vehicle has a lubricating oil reservoir and an open end to the lubricating oil reservoir. The open end of the roller is closed by a cap removably coupled to the open end. The cap has an outer side facing away from the open end, an opposed inner side facing toward the open end, and a recessed gasket seat and a standoff structure formed in the inner side. A compressible gasket is applied into the recessed gasket seat and is positioned between the inner side of the cap and the open end of the roller and is under a compression between the recessed gasket seat and the open end of the roller forming a fluid-impervious seal between the cap and the open end of the roller. The standoff structure interacts between the cap and the open end holding the cap away from the open end limiting the compression of the gasket between the recessed gasket seat and the open end preventing an over-compression of the cap sufficient to damage the gasket or otherwise render the gasket inoperative for its intended purpose which is to form a reliable, fluid-impervious seal between the cap and the open end of the roller that does not quickly wear out and that yields utility over time. The standoff structure includes standoff prominences. The standoff prominences are formed in the recessed gasket seat and the standoff prominences extend away from the recessed gasket seat through the gasket to the open end of the roller and are in direct contact with the open end of the roller holding the cap away from the open end of the roller limiting the compression of the gasket between the recessed gasket seat and the open end of the roller. The gasket has a length and the standoff prominences are equal in size and are equally spaced-apart along the length of the gasket forming an equally spaced-apart standoff distribution along the length of the gasket. The cap is secured to the open end with fasteners. The fasteners are preferably bolts threadably applied to the open end through holes formed through the cap and through the standoff prominences. In a further embodiment, the standoff structure includes a continuous, perimetric prominence in direct, continuous contact with the open end of the roller. The recessed gasket seat and the gasket are located inside of, and are encircled by, the continuous, perimetric prominence.

Consistent with the foregoing summary of preferred embodiments, and the ensuing detailed description, which are to be taken together, the invention also contemplates associated apparatus and method embodiments.

BRIEF DESCRIPTION OF THE DRAWINGS

Referring to the drawings.

DETAILED DESCRIPTION

Figure 1:
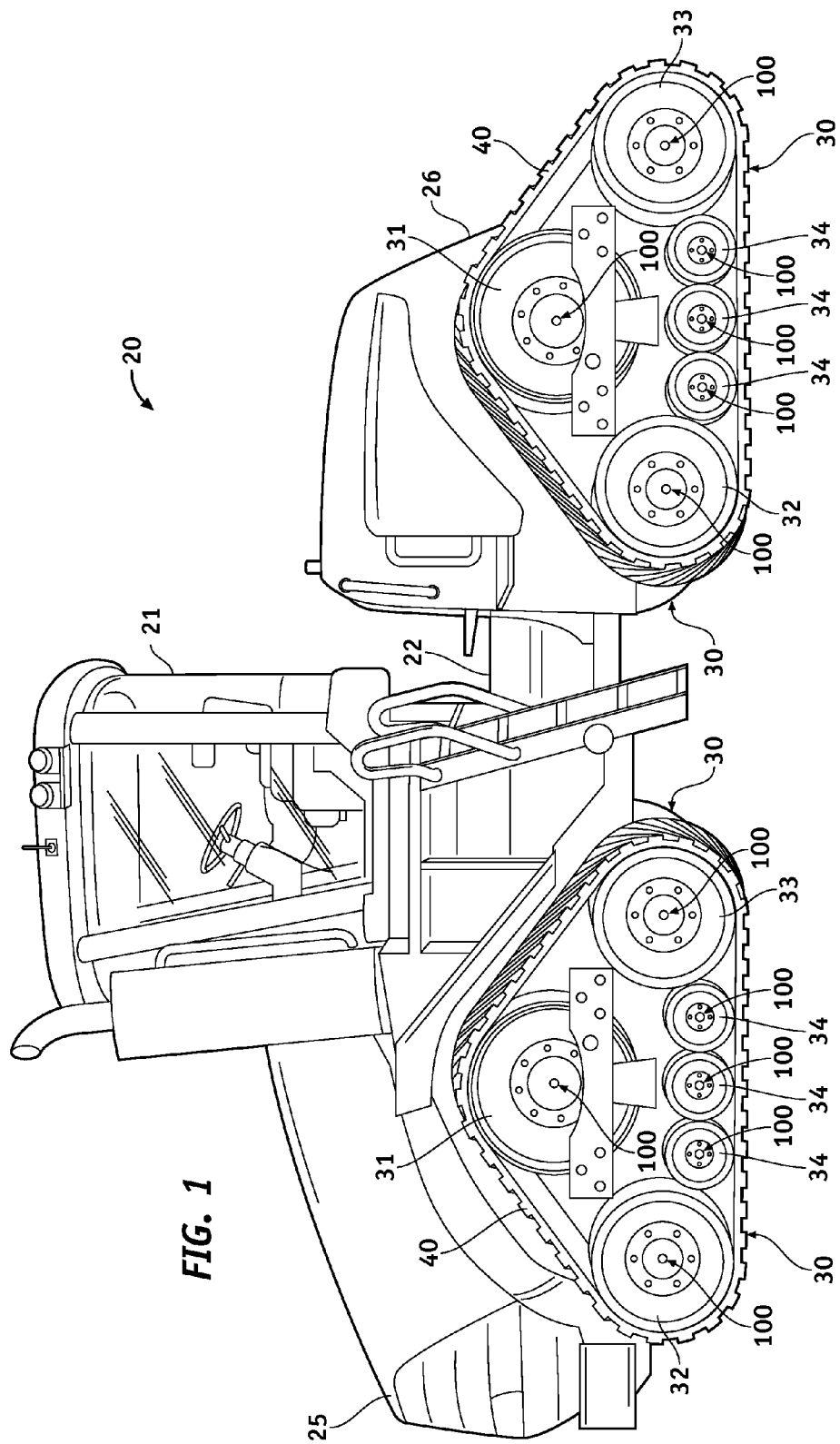
FIG. 1 is a highly generalized perspective view of a tracked vehicle having rollers formed with oil monitoring and maintenance caps.

Turning now to the drawings, in which like reference characters indicate corresponding elements throughout the several views, attention is first directed to FIG. 1 in which there is seen a tracked vehicle 20 that is exemplary of a conventional and well-known articulating tractor including an operator cab 21 supported by a chassis 22 and which is useful for drawing cultivating implements for mechanized cultivating operations as known in the art. Tracked vehicle 20 has a front or leading end denoted generally at 25 and an opposed rear or trailing end denoted generally at 26, which formed with mechanical and hydraulic couplings (not shown) used to operatively couple selected cultivating implements as is known in the art. Vehicle 20 is formed with track assemblies operational for propelling vehicle 20. In the present embodiment, vehicle 20 is formed with four identical track assemblies including left front, right front, left rear, and right rear track assemblies 30, which are secured to chassis 22 in a known manner. The track assemblies 30 are known in the art and are identical and in FIG. 1 only the left front and left rear track assemblies 30 are shown in detail for illustrative purposes. With reference to the left front and left rear track assemblies 30 depicted in FIG. 1 as a matter of example, each track assembly 30 includes a drive roller 31, a front idler roller 32, a rear idler roller 33, and track rollers 34 as is generally known in the art, about which there is entrained an endless track 40. Rollers 31, 32, 33, and 34 are identical in structure but are sized differently in the example of tracked vehicle 20 depicted in FIG. 1. In tracked vehicle drive roller 31 is larger than front and rear idler rollers 32 and 33, which are identical in size, and front and rear idler rollers 32 and 33 are larger than track rollers 34, which are identical in size. As known in the art, drive roller 31 is connected to the engine drive train (not shown) of vehicle 20 and engages endless track 40 to cause translation of endless track 40 when drive roller 31 is rotated by the engine. Drive roller 31 may have teeth that engage within recesses in track 40. Alternatively, track 40 may have teeth that are engaged within recesses in drive roller 31. In either configuration, drive roller 31 can be rotated in either a clockwise or a counterclockwise direction to move vehicle 20 in either a forward or reverse direction. In this regard, vehicle 20 is driven by endless tracks 40 of the various track assemblies 30 to advance vehicle 10.

Figure 8:
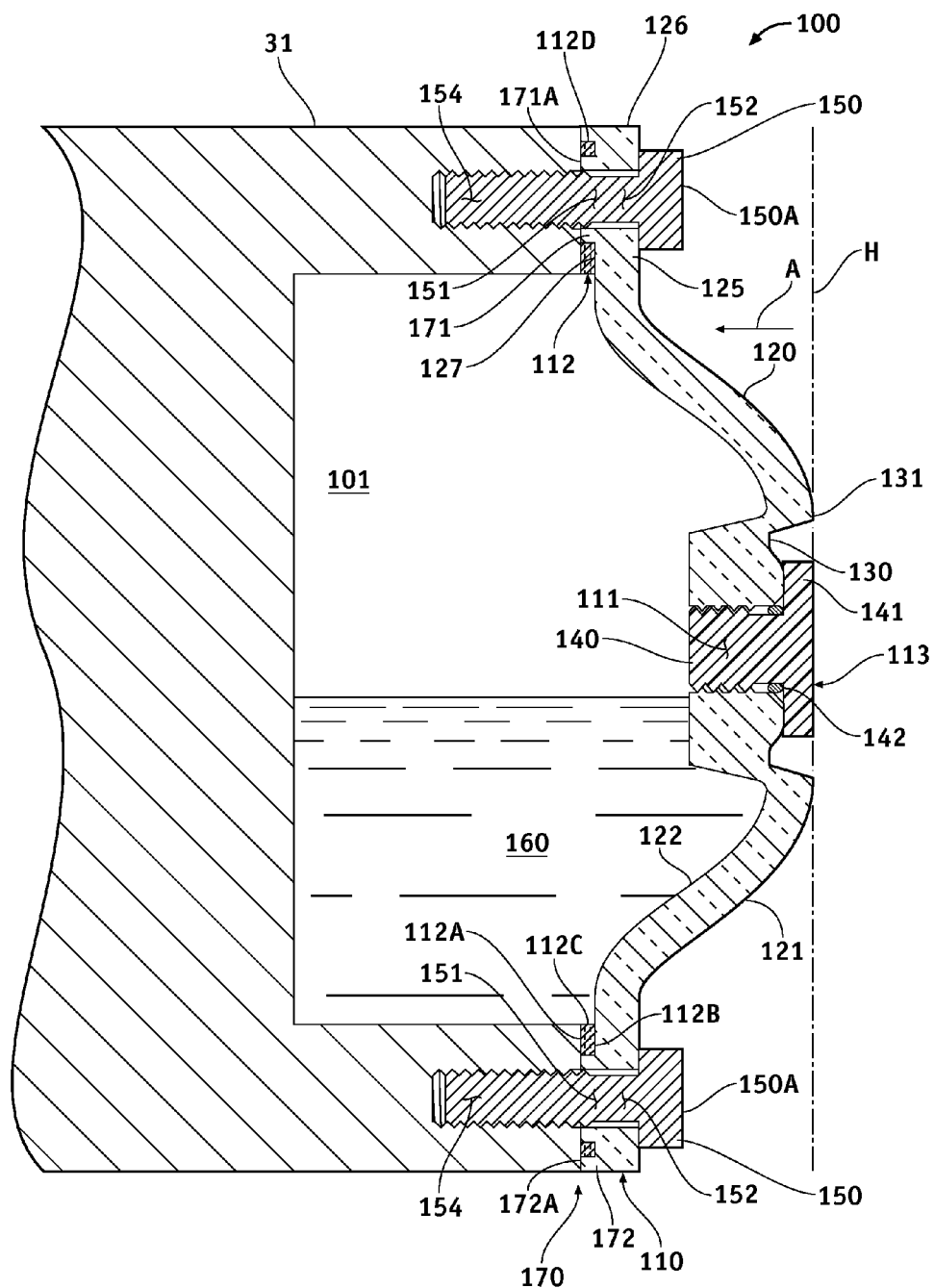
FIG. 8 is a section view taken along line 8-8 of FIG. 7.
Figure 9:
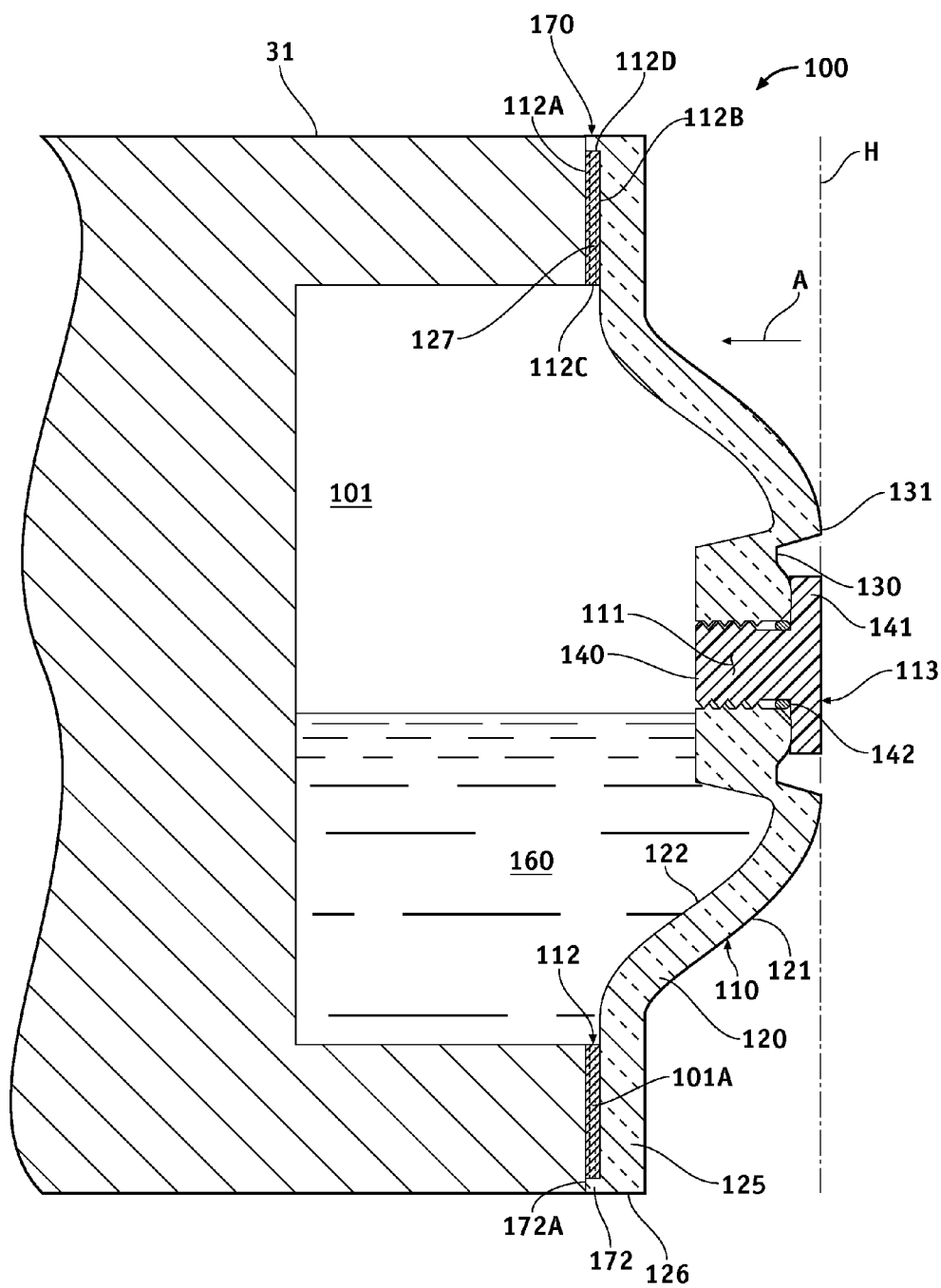
FIG. 9 is a section view taken along line 9-9 of FIG. 7.

As is known in the art, the various rollers of the track assemblies 30 of tracked vehicle 20 are identical in structure as explained above and each of them has an open end that leads to or otherwise communicates with a lubricating oil reservoir that maintains a volume of a lubricating oil, which provides lubrication to reduce roller friction and draw and dissipate heat away from the roller. As a matter of example, FIGS. 8 and 9 illustrate a cross-sectional view of one of the rollers of tracked vehicle 20, which, as a matter of example, is drive roller 31 which, hereafter, will now simply be referred to as roller 31. FIGS. 8 and 9 show a highly generalized configuration of a lubricating oil reservoir 101 of roller 31 and an open end 101A of roller 31 that leads to or that otherwise communicates with reservoir 101, and this is a conventional and well-known arrangement as is known in the art. It is to be understood that the specific construction of vehicle 20 is not relevant to the present invention, and the present invention discussed in the balance of this disclosure may be used with any type of vehicle that is propelled using one or more tracks driven by one or more roller systems like that of tracked vehicle 20.

Figure 2:
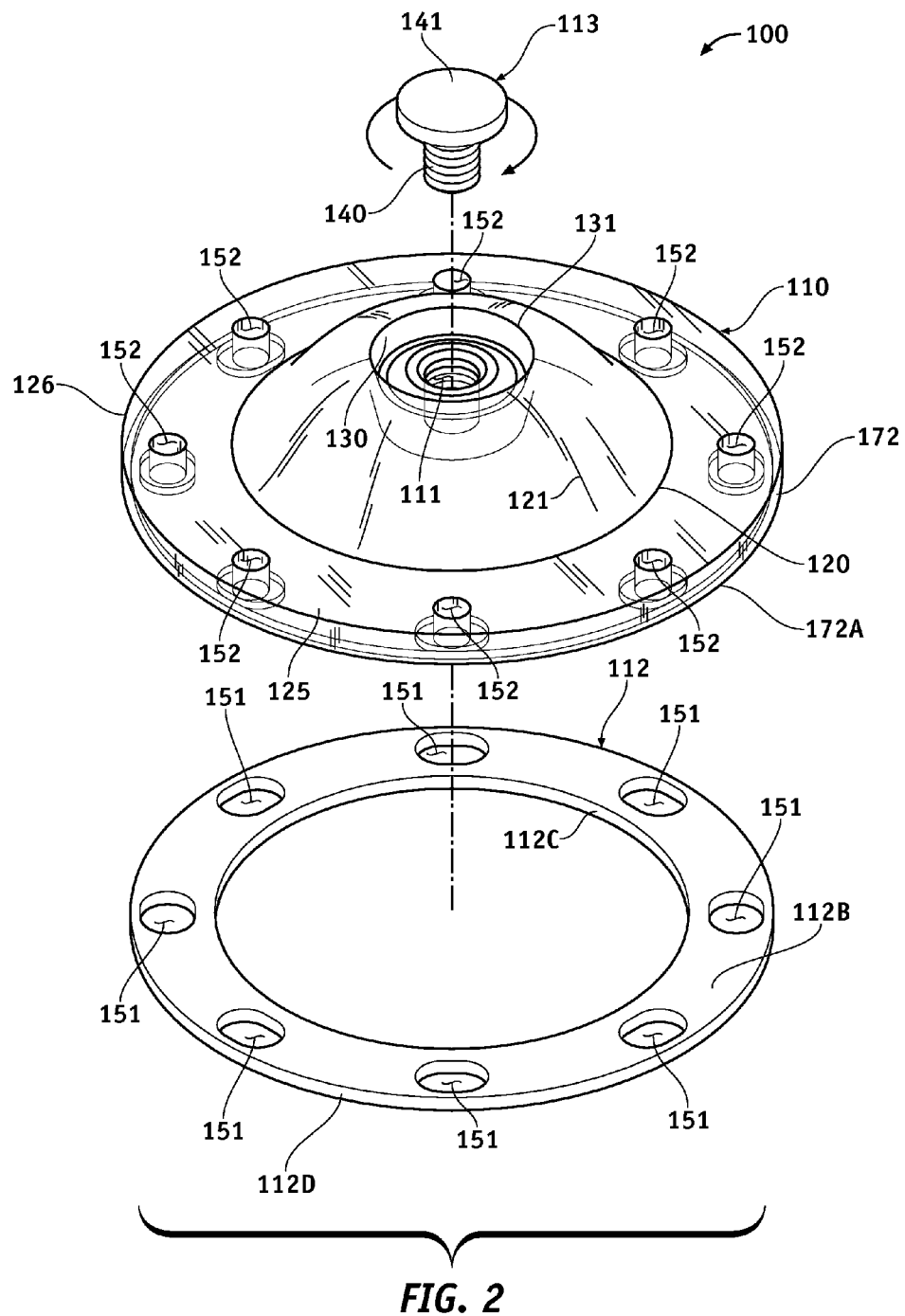
FIG. 2 is an exploded top perspective view of an oil monitoring and maintenance cap assembly for capping the open end of a lubricating oil reservoir of a roller of a tracked vehicle, the oil monitoring and maintenance cap assembly including an oil monitoring and maintenance cap formed with a lubricating oil maintenance port, a gasket, and a plug used to open and close the port formed in the oil monitoring and maintenance cap.

Referring now to FIG. 2, an oil monitoring and maintenance cap assembly 100 constructed and arranged in accordance with the principle of the invention is illustrated, which is used to enclose the lubricating oil reservoir of a roller of tracked vehicle such as a roller of tracked vehicle 20 of FIG. 1. Cap assembly 100 is adapted to be removably secured or otherwise coupled to the open end of the lubricating oil reservoir of a roller of a tracked vehicle for closing the open end of the lubricating oil reservoir enclosing and sealing the volume of lubricating oil in the lubricating oil reservoir, and also provides visual access into the lubricating oil reservoir for lubricating oil level and quality monitoring purposes as will be explained. In the present example, cap assembly 100 is discussed in conjunction with roller 31 and is thus sized or otherwise dimensioned to be installed onto open end 101A of roller 31 as shown in FIGS. 8 and 9 to close open end 101A to reservoir 101 of roller 31. It is to be understood that each roller of each of the track assemblies 30 of tracked vehicle 20 is similarly formed with an attached cap assembly 100, and that the cap assembly for each roller is identical in structure and sized appropriately to facilitate installation onto the open end to the lubricating oil reservoir of the corresponding roller as described below.

Figure 3:
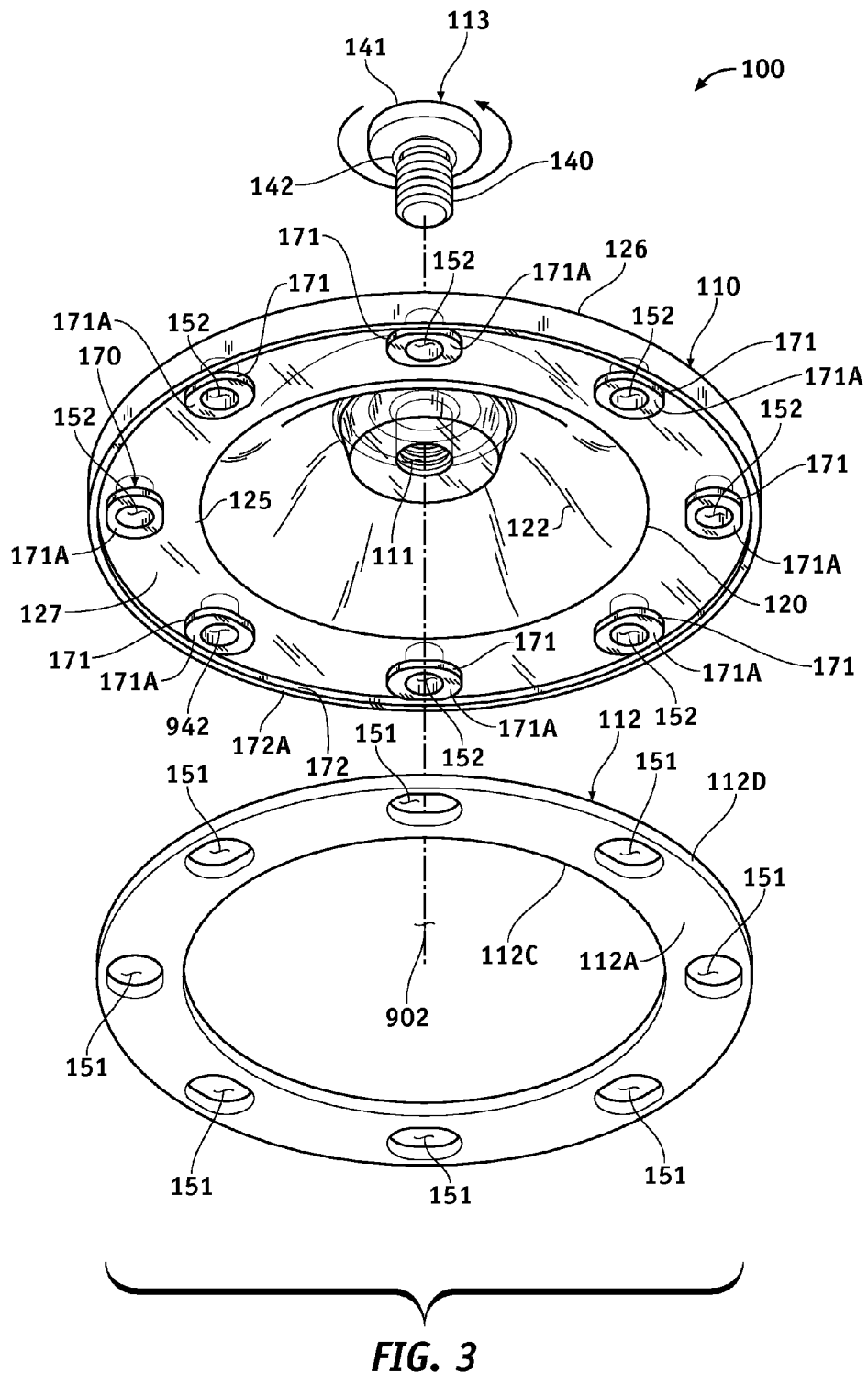
FIG. 3 is an exploded bottom perspective view of the embodiment of FIG. 2.
Figure 4:
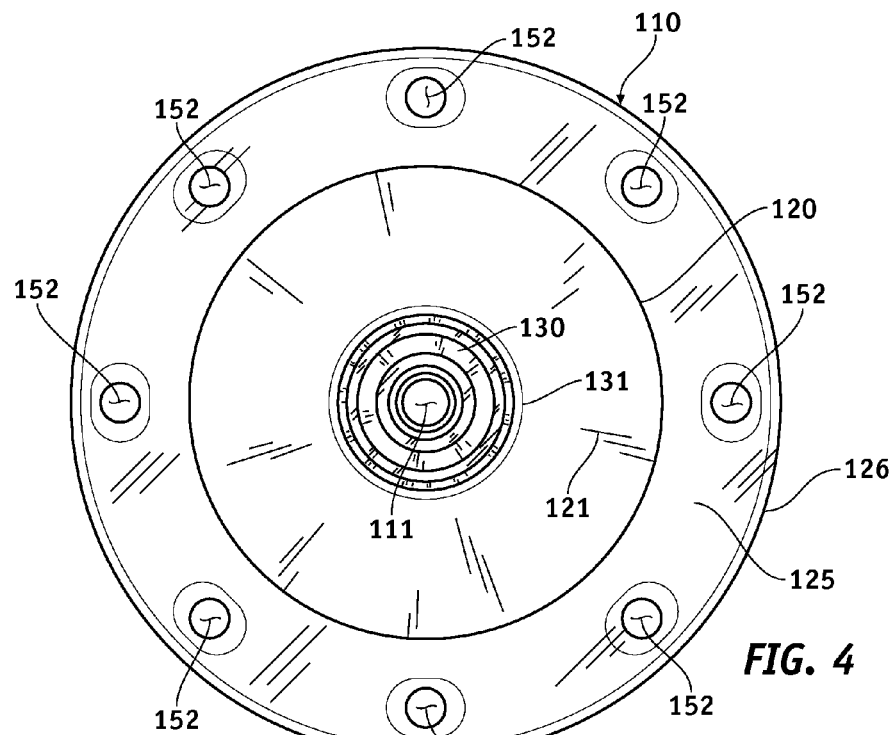
FIG. 4 is a top plan view of the oil monitoring and maintenance cap of FIG. 2.
Figure 5:
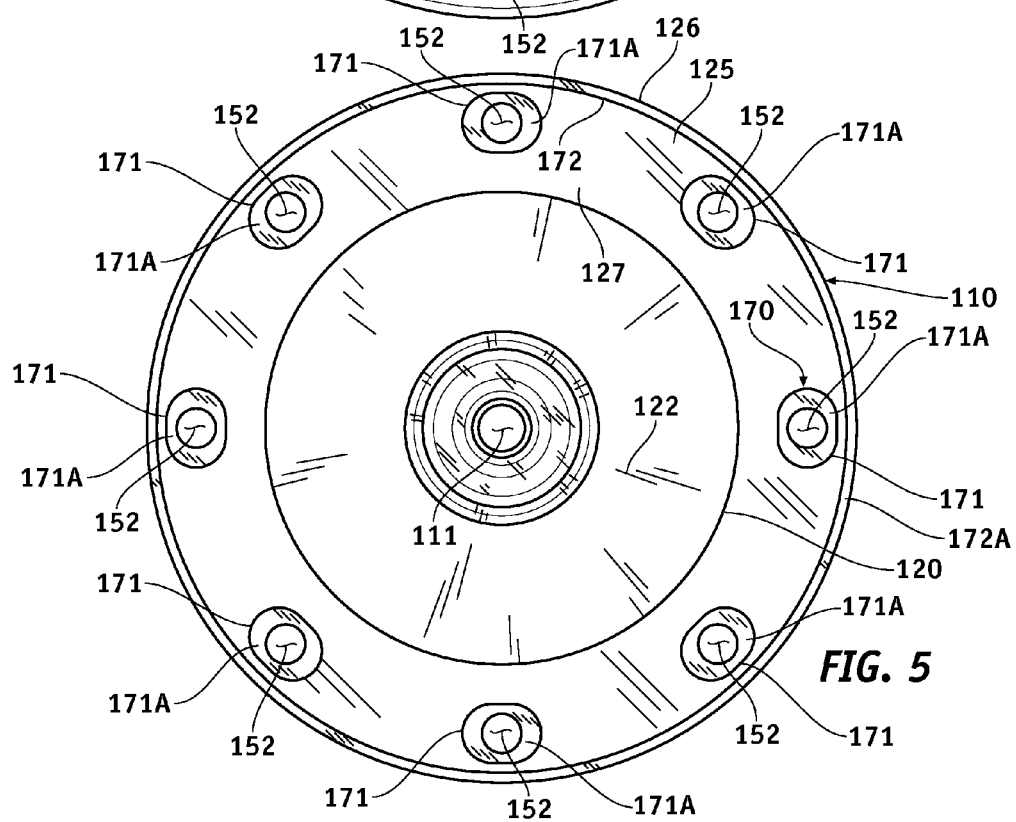
FIG. 5 is a bottom plan view of the oil monitoring and maintenance cap of FIG. 2.
Figure 6:
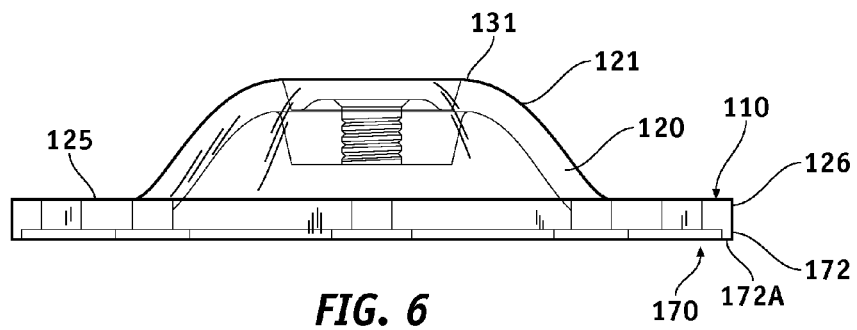
FIG. 6 is a front end elevation view of the oil monitoring and maintenance cap of FIG. 2, the rear end elevation view, the right side elevation view, and the left side elevation view being substantially the same thereof.
Figure 7:
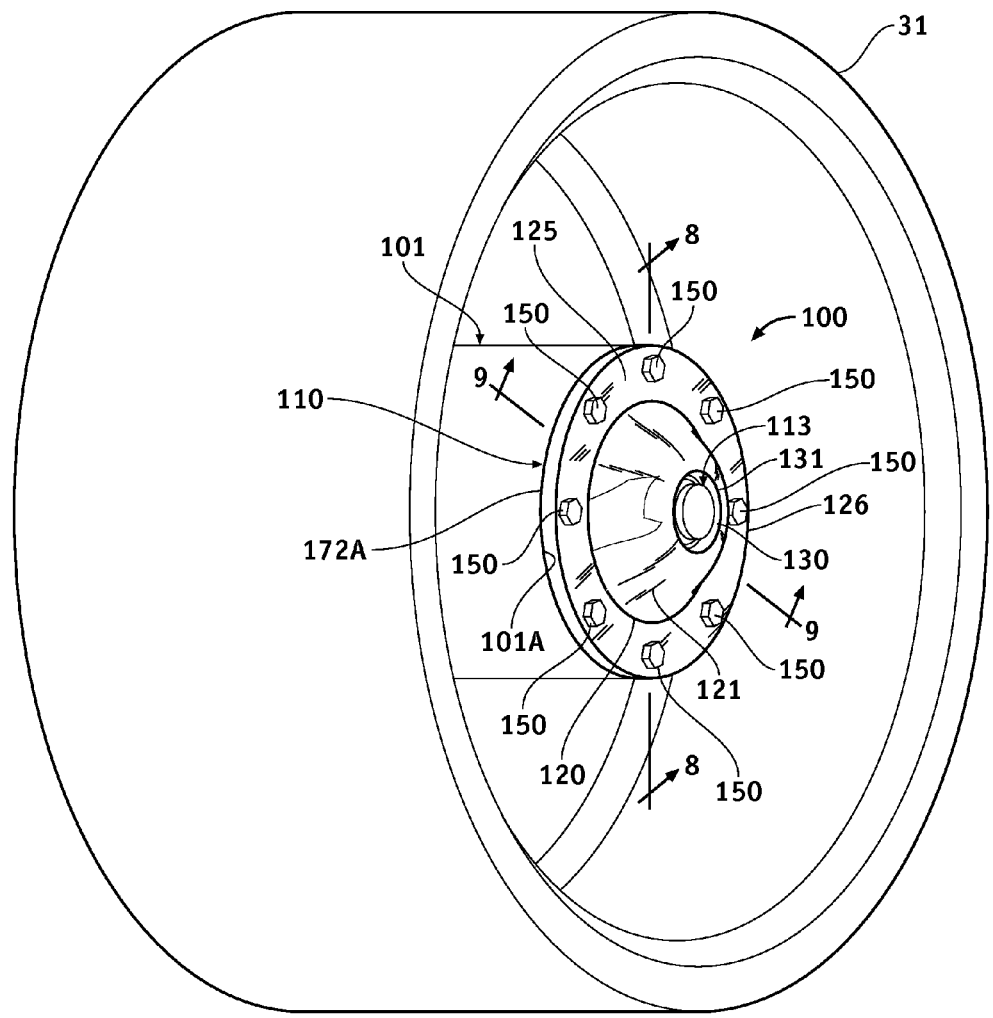
FIG. 7 is a perspective view of the oil monitoring and maintenance cap assembly of FIG. 2 shown as it would appear installed and secured in place with bolts capping a lubricating oil reservoir of a roller of a tracked vehicle.

FIG. 2 is an exploded top perspective view of cap assembly 100, which is discussed in detail below in conjunction with roller 31 as a matter of example. Cap assembly 100 includes an oil monitoring and maintenance cap 110 formed with a lubricating oil maintenance port 111, a gasket 112, and a plug 113 used to open and close port 111 formed in cap 110. FIG. 3 is an exploded bottom perspective view of the embodiment of FIG. 2, FIG. 4 is a top plan view of cap 110, FIG. 5 is a bottom plan view of cap 110, and FIG. 6 is a front end elevation view of cap 110, the rear end elevation view, the right side elevation view, and the left side elevation view thereof of cap 110 being substantially the same thereof, FIG. 7 is a perspective view of cap assembly 100 shown as it would appear installed and secured in place with bolts capping the lubricating oil reservoir of roller 31 of tracked vehicle 20, FIG. 8 is a section view taken along line 8-8 of FIG. 7 illustrating the installation of cap assembly 100 with respect to roller 31, and FIG. 9 is a section view taken along line 9-9 of FIG. 7 illustrating the installation of cap assembly 100 with respect to roller 31.

Referencing FIGS. 2-9 in relevant part, cap 110 is broad and disc-shaped and of substantial construction being formed of a strong, hard, impact resistant, temperature resistant, chemical resistant, non-conductive, and transparent material or combination of materials. A preferred material is transparent plastic, such as transparent nylon. Cap 110 is preferably formed integrally, such as by molding, or machining from a billet or other stock work-piece.

Cap 110 consists of a sealing body 120 that includes an outer face or side 121 and an opposed inner face or side 122 that meet outwardly from the geometric center of cap 110 at an outer perimeter extremity, which, in the present embodiment, is characterized by a circular perimeter or perimetric flange 125 that terminates outwardly with a continuous marginal edge 126. Sealing body 120 has a substantially uniform thickness extending between outer and inner sides 121 and 122. In the present embodiment, sealing body 120 has a thickness extending between outer and inner sides 121 and 122 in a range of approximately 4-9 millimeters. The inner side 122 of cap 110 at flange 125 defines a continuous, annular gasket-receiving area or seat 127.

As best seen in FIGS. 8 and 9, sealing body 120 bulges outwardly from perimetric flange 125, characterized in that outer and inner sides 121 and 122 of sealing body 120 are convex and concave, respectively, extending from perimetric flange 125 to the geometric center of sealing body 120 formed by a depressed part of sealing body 120, which is a depression 130 encircled by a raised rim 131. Depression 130 and raised rim 131 are formed in sealing body 120 in outer side 121 of sealing body 120. Depression 130 is formed in outer side 121 of sealing body 120 at the geometric center of sealing body 120, and is encircled by raised rim 131. Port 111 is formed in sealing body 120 at the geometric center of sealing body 120, and is formed at depression 130 formed in sealing body 120 as illustrated. Port 111 extends through sealing body 120 at depression 130 from outer face 121 of sealing body 120 to inner face 122 of sealing body 120.

Port 111 is adapted to receive plug 113 to close and seal port 111. Looking to FIGS. 2, 3, 8 and 9, plug 113 is formed of a strong, hard, impact resistant, temperature resistant, chemical resistant, and non-conductive material or combination of materials, such as plastic, and consists of a threaded post 140 formed with a broad, enlarged head 141. A gasket 142, shown in FIGS. 3, 8, and 9, encircles post 140, and is located along the underside of head 141. Post 140 relates to port 111 and is used to open and close port 111, in which case plug 113 is movable between an open position detached from and opening port 111 as shown in FIGS. 2 and 3 to provide access therethrough to a lubricating oil reservoir of a roller for lubricating oil replacement and replenishment purposes, and a closed position applied to and closing port 111 as shown in FIGS. 8 and 9. Port 111 is inwardly threaded, and post 140 of plug 113 is correspondingly outwardly threaded. To apply and secure plug 113 to port 111, plug 113 is taken up, such as by hand, and applied into depression 130 in a direction toward outer face 121 and post 140 is applied to port 111 and is threaded into port 111 through rotation and is tightened in place such as with a wrench tightening the underside of head 140 against outer face 121 at depression 130. In the closed position of plug 113 as shown in FIGS. 8 and 9, gasket 142 is applied between head 141 of plug 113 and port 111 providing a fluid-impervious seal between plug 113 and port 111.

As seen in FIGS. 8 and 9, rim 131 defines and extends along a plane or horizon H, and depression 130 extends into outer face 121 and is defined inwardly from horizon H. In the closed position of plug 113 applied to and closing port 111, plug 113 is positioned in depression 130 and extends outwardly from outer face 121 of sealing body 120 into depression 130 no further than horizon H of rim 131 thereby isolating plug 113 from shearing forces across outer face 121 of sealing body 120 along horizon H. In a further and more specific aspect, in the close position of plug 113 threaded in port 111 and tightened in place the underside of head 114 is tightened against outer face 121 of sealing body 120 at depression 130, and head 140 of plug 113 projects or otherwise extends outwardly from outer face 121 of sealing body 120 and into depression 130 no further than horizon H of rim 131 thereby isolating head 140 of plug 113 from shearing forces across outer face 121 of sealing body 120 along horizon H.

Figure 10:
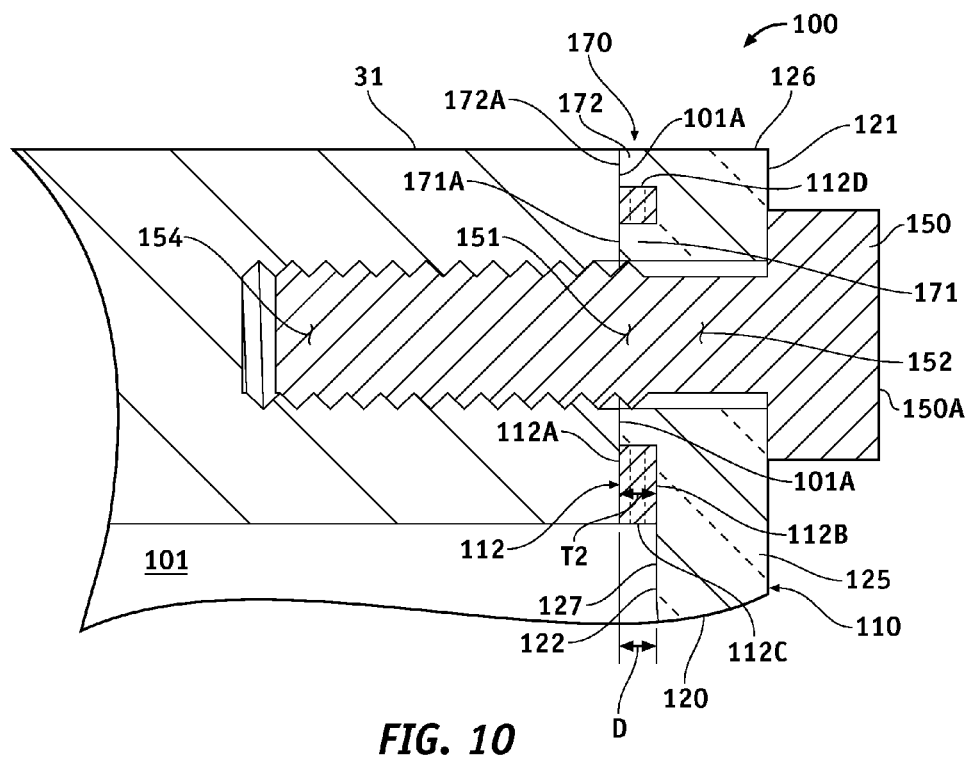
FIGS. 10 and 11 are an enlarged, fragmented, section views of the embodiment of FIG. 7 illustrating the installation of the oil monitoring and maintenance cap assembly to the roller.
Figure 11:
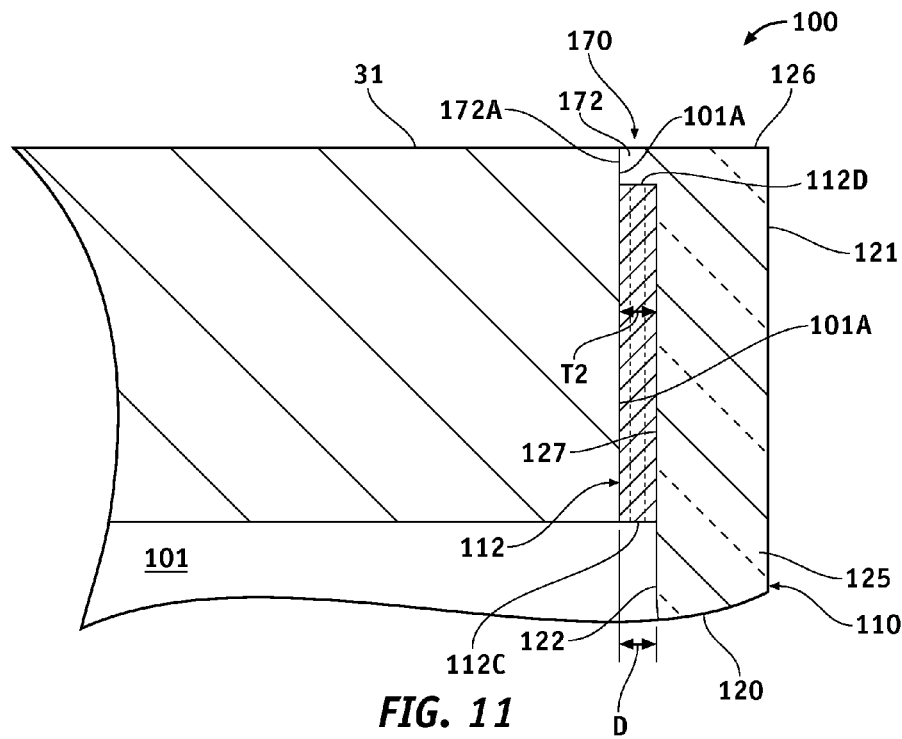
Figure 14:
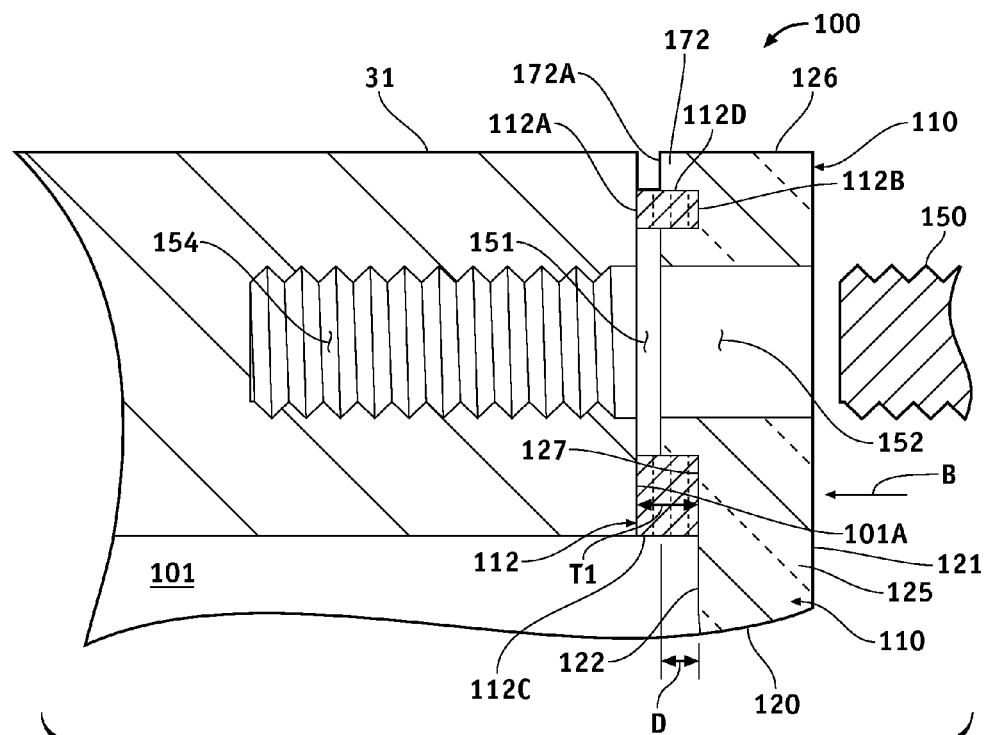
FIGS. 14 and 15 are an enlarged, fragmented, section views of the embodiment of FIG. 7 illustrating the application of the oil monitoring and maintenance cap assembly to the roller in preparation for being secured in place to the roller.
Figure 15:
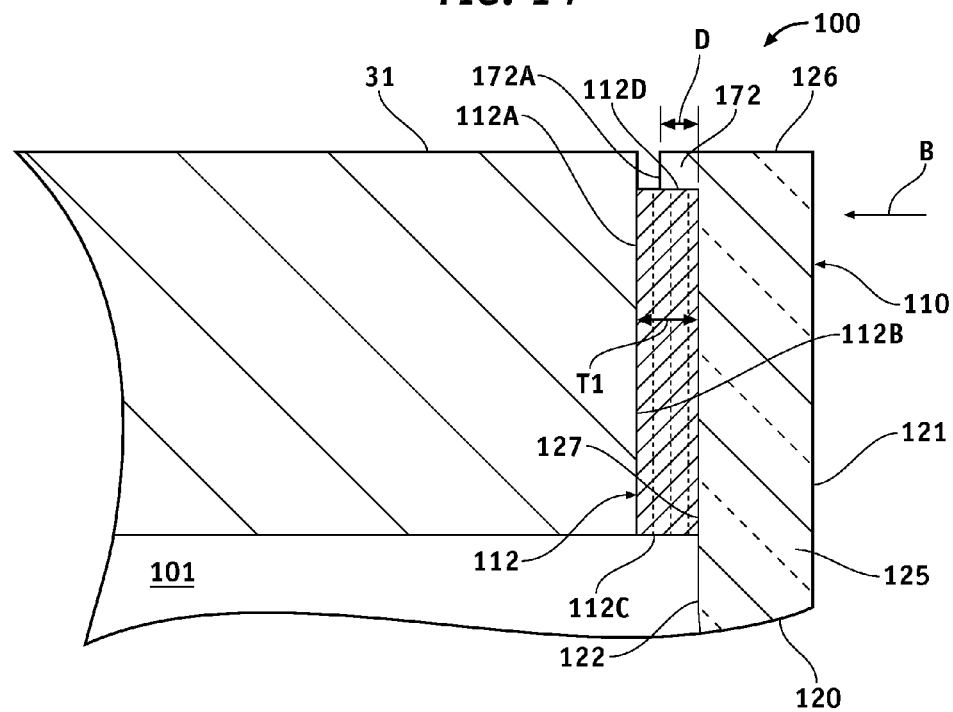

Referencing FIGS. 2 and 3, gasket 112 is a circular perimeter or perimetric gasket having a length, which is the length of the circle or perimetric shape of gasket 112, opposed faces 112B and 112A, and opposed inner and outer perimeter edges 112C and 112D extending therebetween. Gasket 112 relates to seat 127 formed by inner side 122 of flange 125 such that seat 127 accepts gasket 112. Face 112B of gasket 112 is considered the outer face of gasket 112, and face 112A of gasket 112 is considered the inner face of gasket 112. Gasket 112 is compressible gasket in that it formed of compressible or compressibly deformable material such that gasket 112 is compressible in a vertical direction with respect faces 112B and 112A. At rest gasket 112 has an at-rest thickness between faces 112B and 112A denoted by T1 in FIGS. 14 and 15. When gasket 112 is compressed to an optimum or recommended compression, gasket 112 has a compressed thickness between faces 112B and 112A denoted by T2 in FIGS. 10 and 11. At-rest thickness T1 is greater than compressed thickness T2.

FIGS. 8 and 9 are highly generalized representations of a lubricating oil reservoir 101 formed in roller 31 and which has open end 101A to reservoir 101, and this is a conventional and well-known arrangement as is known in the art. Gasket 112 and seat 127 of flange 125 of cap 110 relate to each other and to open end 101A to reservoir 101. In regards to the installation of assembly 100 to roller 31 to cap reservoir 101 with reference in relevant part to FIGS. 12-15, face 112A of gasket 112 is applied to open end 101A, and cap 110 is then taken up and inner side 122 is directed toward open end 101A and cap 110 is then moved toward open end 101A so as to apply inner side 122 of cap 110 at flange 125, which defines seat 127 of flange 125, against face 112B of gasket 112. At this point with gasket 112 applied to seat 127 and sandwiched or otherwise applied between seat 127 of cap 110 and open end 101A of roller 31, gasket 112 is not under compression and is at rest and in its at-rest thickness T1, which separates cap 110 from open end 101A of roller 31 by a distance keeping cap 110 from directly contacting open end 101A of roller 31 as shown in FIGS. 12-15 and this defines an un-seated position of cap 110 relative to open end 101A in preparation for installation. Cap 110 is then secured in place to open end 101A of roller 31 by forcing cap 110 toward open end 101A in the direction indicated by arrowed line B in FIGS. 12-15 bringing flange 125 of cap 110 into direct contact with open end 101A as shown in FIGS. 8-11 defining a seated position of cap 110 relative to open end 101A compressing gasket 112 by and between seat 127 of cap 110 and open end 101A of roller 31 from its at-rest thickness T1 between faces 112B and 112A as referenced in FIGS. 12-15 to compressed thickness T2 of gasket 112 between faces 112B and 112A as shown in FIGS. 8-11, and cap 110 is removably secured in place to open end 101A at flange 125 in its seated position relative to open end 101A of roller 31 closing open end 101A with cap 110. With cap 110 so secured to open end 101A in the seated position of cap 110, sealing body 120 spans open end 101A of reservoir 101 and gasket 112 applied between seat 127 of cap 110 and open end 101A of roller 31 is under a compression between open end 101A and inner side 122 of cap 110 at flange 125 and is compressed into its compressed thickness T2 to provide a fluid-impervious seal between sealing body 120 and open end 101A. With assembly 100 so installed, outer face 121 of sealing body 120 faces away from open end 101A and opposed inner face 122 faces open end 101A to reservoir 101. Cap 110 is preferably installed with plug 113 applied to and closing port 111. However, plug 113 may be applied to close port 111 after cap 110 is installed on open end 101A of reservoir 101.

Figure 12:
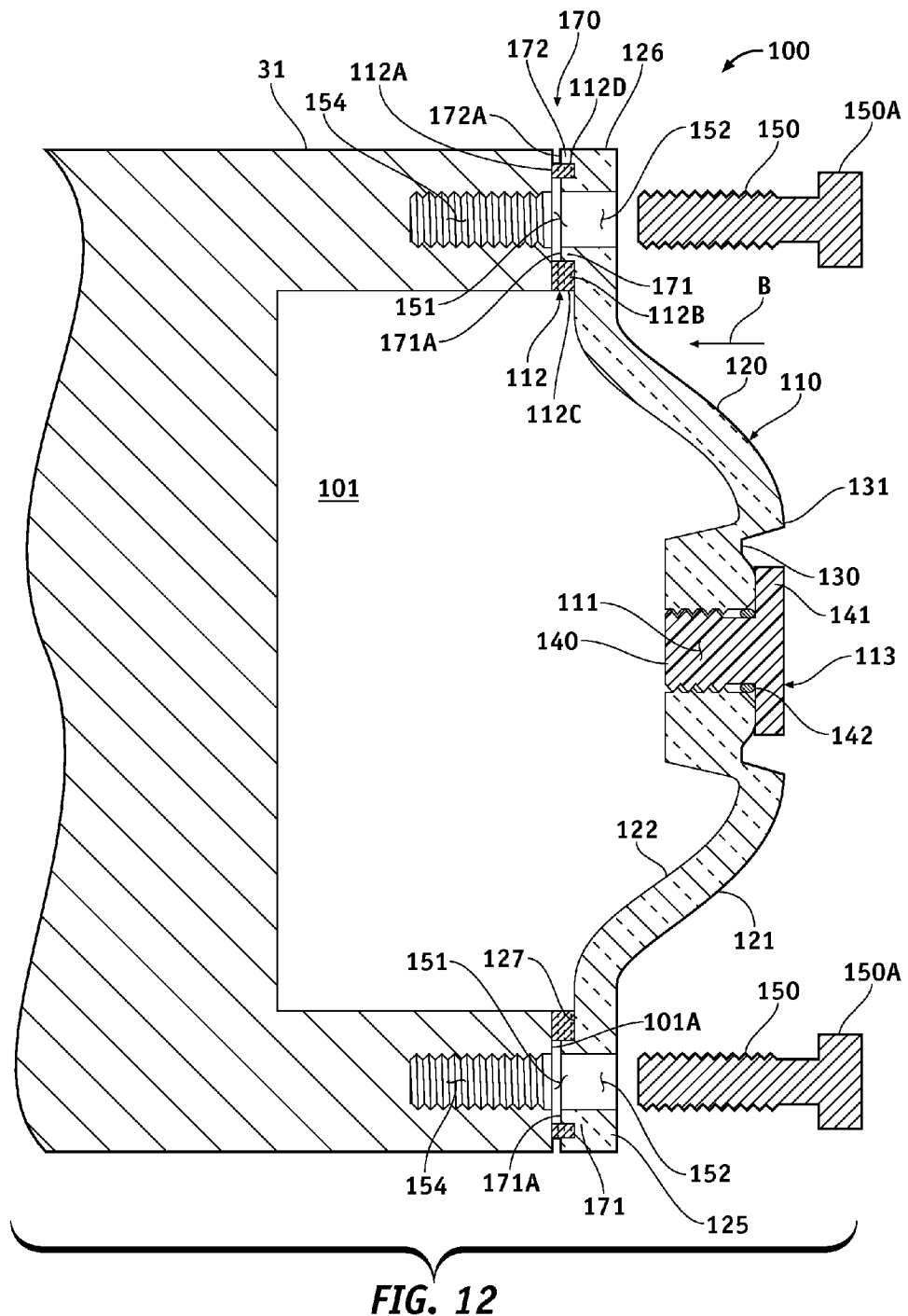
FIG. 12 is a view similar to that of FIG. 8 illustrating the oil monitoring and maintenance cap assembly as it would appear positioned in place relative to the roller in preparation for being secured in place to the roller with bolts.
Figure 13:
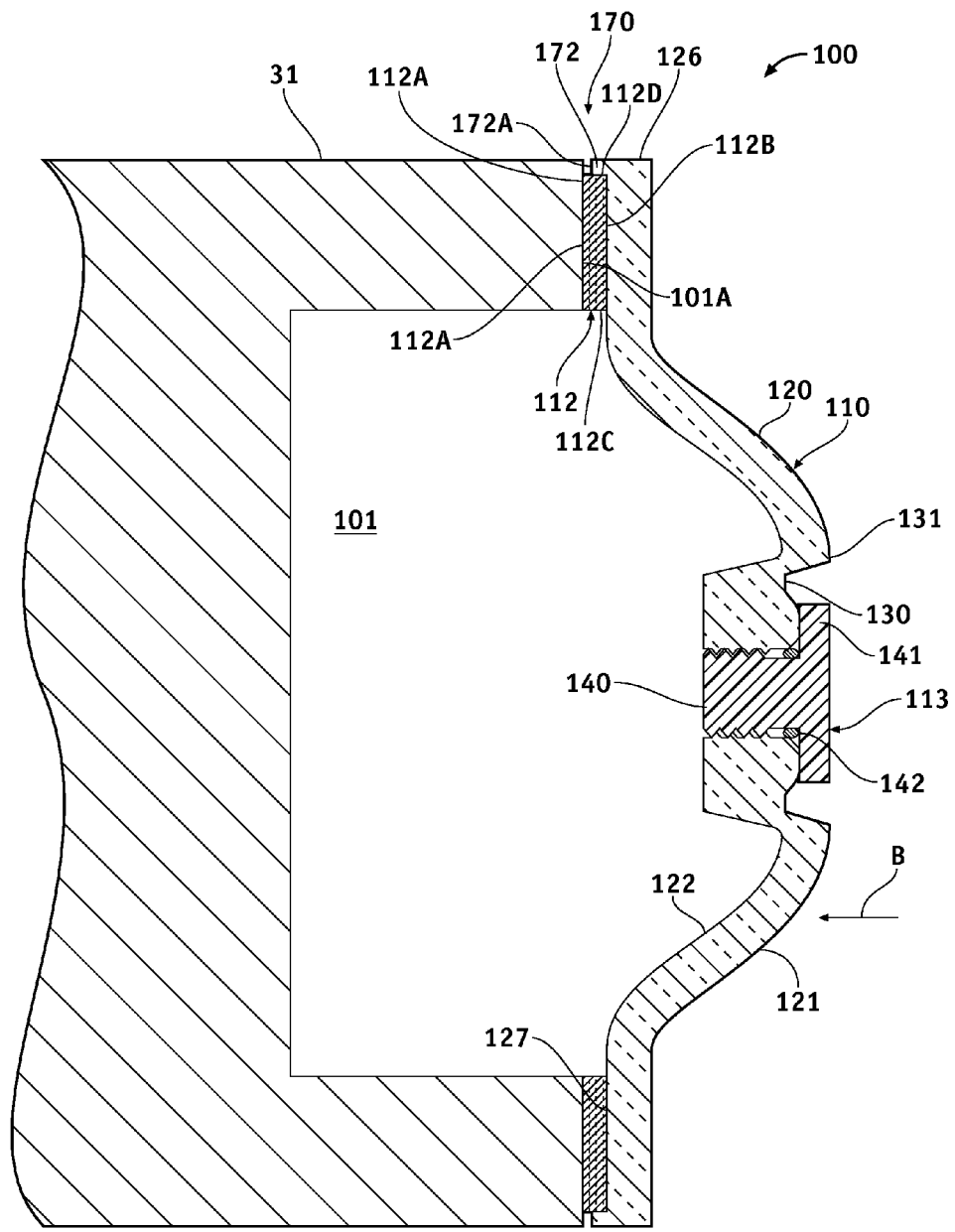
FIG. 13 is a view similar to that of FIG. 9 illustrating the oil monitoring and maintenance cap assembly as it would appear positioned in place relative to the roller in preparation for being secured in place to the roller.

Cap 110 is secured to open end 101A of reservoir with a fastening structure coupled between cap 110 and open end 101A of roller 31. In the present embodiment, the fastening structure consists of fasteners in the form of bolts 150 as shown and referenced in FIGS. 7, 8, 10, and 12, and which are tightened in place as shown in FIG. 8 securing cap 110 to open end 101A of roller 31 securing cap 110 in its seated position keeping gasket 112 compressed into its compressed thickness T2 between open end 101 of roller 31 and inner side 122 of cap 110 at flange 125, namely, seat 127. In this embodiment, the length of gasket 112 is formed with equally spaced-apart bolt holes 151 and flange 125 is formed with corresponding equally spaced-apart bolt holes 152 that correspond with bolt holes 151 formed in gasket 112. Bolt holes 151 of gasket 112 and bolt holes 152 of flange 125 relate or otherwise correspond to the conventional arrangement of equally spaced-apart bolt holes 154 formed in open end 101A of reservoir 101. Bolt holes 154 form part of the fastening structure. As a matter of illustration and reference, FIGS. 8 and 9 show two such bolt holes 154 formed in open end 101A of reservoir 101. In the application of assembly 100 to open end 101A of reservoir 101, bolt holes 151 of gasket 112 are aligned or otherwise registered with the bolt holes 154 formed in open end 101A of reservoir 101 and bolt holes 152 of flange 125 are, in turn, aligned or otherwise registered with bolt holes 151 formed gasket 112 and thus bolt holes 154 formed in open end 101A of reservoir 101. Bolts 150 are registered with the bolt holes 154 formed in open end 101A of roller 31 and with the aligned bolt holes 151 and 152 of gasket 112 and cap 110 of cap assembly 100 as shown in FIG. 12 and then bolts 150 are applied to bolt holes 154 formed in open end 101A of roller 31 via aligned bolt holes 151 and 152 of gasket 112 and cap 110 and are threaded into bolt holes 154 formed in open end 101A of reservoir 101 and are then tightened down through rotation applying heads 150A of bolts 150 against outer side 121 of cap 110 at flange 125 removably coupling cap 110 to open end 101A of roller 31 in the seated position of cap 110 relative to open end 101A of roller 31 keeping gasket 112 compressed to its compressed thickness T2 between cap 110 and open end 101A of roller 31. In the present embodiment there are eight bolt holes 154 in open end 101A of reservoir 101, and there are eight corresponding bolt holes 151 in gasket 112 and eight corresponding bolt holes 152 in cap 110 that correspond with the eight bolt holes 154 formed in open end 101A, and less or more such holes may be provided as may be desired depending on specific needs and/or size considerations.

And so having secured assembly 100 in place to open end 101A of reservoir 101 as shown in FIGS. 8 and 9 closing open end 101A and with plug 113 installed in place in its closed position closing port 111, a volume of a lubricating 160 is then applied to reservoir 101 in the conventional manner, and roller 31 is then prepared and ready for use in the operation of vehicle 20 (FIG. 1) in the normal manner. As cap 110 is transparent, sealing body 120 spanning open end 101A of reservoir 101 is transparent to provide visual access therethrough in the direction indicated by arrowed line A into reservoir 101 through open end 101A for lubricating oil level and quality monitoring purposes, in accordance with the principle of the invention.

In the normal and customary operational position of roller 31, as with all of the rollers of the track assemblies of tracked vehicle 20, reservoir 101 is horizontal and open end 101A is vertical, and this orientation is clearly depicted in FIGS. 8 and 9. In this orientation of reservoir 101 and open end 101A, cap 110 is vertically disposed such that sealing body 120 extends vertically across open end 101A of reservoir 101. The volume of lubricating oil 160 applied to reservoir 101 thus extends upwardly into reservoir 101 along inner face 122 of sealing body 120 to level 160A just below port 111 closed and sealed by plug 113. Again, the transparent character of sealing body 120 provides visual access therethrough into lubricating oil reservoir 101 through open end 101A for lubricating oil 160 level 160A and quality monitoring purposes. As the volume of lubricating oil 160 is readily and easily visualized through sealing body 120, level 160A of lubricating oil 160 can easily be seen as can the quality of the volume of lubricating oil 160. Should level 160A of the volume of lubricating oil 160 be seen as too low, it may be replenished. Should the quality of the volume of lubricating oil 160 be seen as compromised, such as by dirt and debris, the volume of lubricating oil 160 may be withdrawn from reservoir 101 and replaced. Port 111 is useful for replenishing and replacing lubricating oil in reservoir 101. To replenish the volume of lubricating oil 160 should level 160A fall to an unacceptably low level, plug 113 is be detached from port 111 and moved to its open position to open port 111, replenishing oil is applied to reservoir 101 through open port 111, and port 111 is reclosed by reinstalling plug 113 to port 111 placing plug 113 back to its closed position closing and sealing port 111. To replace volume of lubricating oil 160 with a fresh volume of a lubricating oil, plug 113 is detached from port 111 and moved to its open position to open port 111, volume of lubricating oil 160 is withdrawn from reservoir 101 through port 111, a fresh volume of a lubricating oil is applied to reservoir 101 through port 111, and port 111 is reclosed by reinstalling plug 113 to port 111 placing plug 113 back to its closed position closing and sealing port 111.

In the vertical positioning of cap 110 as shown in FIGS. 8 and 9 such that sealing body 120 extends vertically across open end 101A of reservoir 101, it is again emphasized that in the closed position of plug 113 applied to and closing port 111, plug 113 is positioned in depression 130 and extends outwardly from outer face 121 of sealing body 120 into depression 130 no further than horizon H of rim 131 thereby isolating plug 113 from shearing forces across outer face 121 of sealing body 120 that could otherwise rip plug 113 from port 111 or otherwise damage plug 113. These shearing forces can be applied by plants or crops or bushes or the like that brush across outer face 121 of sealing body 120 in the normal operation of roller 31 in the normal operation of vehicle 20 shown in FIG. 1. More particularly, in the close position of plug 113 threaded in port 111 and tightened in place the underside of head 114 is tightened against outer face 121 of sealing body 120 at depression 130, and head 140 of plug 113 projects or otherwise extends outwardly from outer face 121 of sealing body 120 into depression 130 no further than horizon H of rim 131 thereby isolating head 140 of plug 113 from shearing forces across outer face 121 of sealing body 120 that, again, could otherwise rip plug 113 from port 111 or otherwise damage plug 113.

As a practical matter in regards to the installation of cap assembly 100 to open end 101A of roller 31 with bolts 150 with reference to FIG. 12, face 112A of gasket 112 is applied to and against open end 101A of roller 31, and inner side 122 of cap 110 is directed toward open end 101A and seat 127 as defined by inner side 122 of cap 110 at flange 125 is applied to and against face 112B of gasket 112 so as to apply gasket 112 to seat 127 of cap 110 sandwiching gasket 112 between seat 127 of cap 110 and open end 101A of roller 31. Bolt holes 151 of gasket 112 are aligned or otherwise registered with the bolt holes 154 formed in open end 101A of reservoir 101 and bolt holes 152 of flange 125 are, in turn, aligned or otherwise registered with bolt holes 151 formed gasket 112 and thus bolt holes 154 formed in open end 101A of reservoir 101. At this point with gasket 112 sandwiched or otherwise applied between seat 127 of cap 110 and open end 101A of roller 31, gasket 112 is at its at-rest thickness T1 separating cap 110 from open end 101A of roller 31 keeping cap 110 from directly contacting open end 101A of roller 31 as shown in FIGS. 12-15 defining the un-seated position of cap 110 in preparation for installation to open end 101A. Bolts 150 are registered with the bolt holes 154 formed in open end 101A of roller 31 and with the aligned bolt holes 151 and 152 of gasket 112 and cap 110 of cap assembly 100 as shown in FIG. 12 and then bolts 150 are applied to bolt holes 154 via aligned bolt holes 151 and 152 and are threaded into bolt holes 154 formed in open end 101A of roller 31 and are then tightened down through rotation applying heads 150A of bolts 150 against outer side 121 of cap 110 at flange 125 and then bolts 150 are tightened through continued rotation, which draws heads 150A of bolts 150 against outer side 121 of cap 110 at flange 125. Bolts 150 are then further tightened through still continued rotation drawing bolts 150 inwardly toward roller 31 indicated by arrowed line B causing heads 150A of bolts 150 forcibly act against outer side 121 of cap 110 at flange 125 drawing cap 110 inwardly toward open end 101A of roller in the same direction indicated by arrowed line B from the unseated position of cap 110 defining the at-rest thickness T1 of gasket 112 as shown in FIG. 12 to the seated position of cap 110 defining the compressed thickness T2 of gasket 112 as shown in FIG. 8 at which point bolts 150 are considered fully tightened securing cap 110 in place in its seated position. And so through the application of bolts 150 as explained above, bolts 150 are used to displace cap 110 from its un-seated position relative to open end 101A of roller 31 to its seated position relative to open end 101A of roller 31 concurrently compressing gasket 112 between seat 127 of cap 110 and open end 101A of roller 31 from its at-rest thickness T1 referenced in FIGS. 12-15 to its compressed thickness T2 referenced in FIGS. 8-11.

Turning back to FIGS. 2 and 3, gasket 112 is a sealing gasket and is applied between cap 110 and the open end of a lubricating oil reservoir of a roller, such as open end 101A of lubricating oil reservoir 101 of roller 31 as shown in FIGS. 8 and 9, to provide a fluid-impervious seal between cap 110 and the open end of the lubricating oil reservoir. As explained above, gasket 112 is compressible gasket in that it formed of compressible or compressibly deformable material such that gasket 112 is compressible in a vertical direction with respect faces 112B and 112A between at-rest thickness T1 as referenced in FIGS. 12-15 and compressed thickness T2 referenced in FIGS. 8-11. To ensure gasket 112 provides a fluid impervious seal between cap 110 and open end 101A of roller 31 as shown in FIGS. 8 and 9, it is preferred that gasket 112 undergo an applied optimum or recommended compression between cap 110 and open end 101A sufficient to compress gasket 112 from its at-rest thickness T1 to its compressed thickness T2, which is defined as the optimum or recommended compressed thickness T2 of gasket 112 sufficient to allow gasket 112 to perform a sealing gasket function which is to form a fluid impervious seal between cap 110 and open end 101A of roller 31 and to render gasket 112 operative for its intended purpose which is to form a reliable, fluid-impervious seal between cap 110 and open end 101A of roller 31 that does not quickly wear out and that yields utility over time, which typically is an operational period of approximately 8-12 months before gasket 112 should be replaced according to routine maintenance. Over-compressing gasket 112 beyond the compressed thickness T2, namely, the optimum or recommended compression of gasket 112, could crack or damage gasket 112, which his undesirable and could cause gasket 112 to fail or otherwise be rendered inoperative for its intended purpose, which is to form a reliable, fluid-impervious seal between cap 110 and open end 101A of roller 31 that does not quickly wear out and that yields utility over time.

In the present embodiment, gasket 112 is conventionally formed of a cork buna formulation, which is a well-known material commonly found in sealing gaskets, such as sealing gasket 112, as is known in the art. In the present embodiment, the at-rest thickness of gasket 112 between faces 112B and 112A is approximately 90 thousands of an inch, and the compressed thickness T2 of gasket 112, which is the optimum or recommended compressed thickness of gasket 112, is approximately 60 thousandths of an inch. To facilitate the optimum or recommended compression of gasket 112 to produce the optimum or recommended compressed thickness T2 of gasket 112 in the installation of cap assembly 100, inner side 122 of cap 110 is formed with a standoff structure denoted at 170 in FIG. 3. Standoff structure 170 interacts between cap 110 and open end 101A of roller 31 to hold cap 110 away from open end 101A of roller 31 in the seated position of cap 110 as shown in FIGS. 8-11 limiting the compression of gasket 112 between cap 110 and open end 101A to the compressed thickness T2 of gasket 112 and preventing an over-compression of gasket 112 beyond its compressed thickness T2.

Referring to FIGS. 3 and 5, inner side 122 of flange 125 of cap 110 is formed with standoff structure 170. Standoff structure 170 is considered part of flange 125. Standoff structure 170 includes standoff prominences each denoted generally at 171, and also a continuous, perimetric standoff prominence denoted generally at 172, all of which extend outwardly from inner face or side 122 of cap 110 at flange 125 a distance equal to a standoff distance denoted at D in FIGS. 10, 11, and 13-15. Standoff distance D is defined as compressed thickness T2 of gasket 112. The at-rest thickness T1 of gasket 112 is greater than the compressed thickness T2 of gasket 112. In the present example, the at-rest thickness T1 of gasket 112 is approximately 90 thousandths of an inch and the compressed thickness T2 of gasket 112 is approximately 60 thousandths of an inch, and standoff distance D is, therefore, 60 thousandths of an inch being equal to compressed thickness T2 of gasket 112. Accordingly, the standoff structure 170 of cap 110 consisting of standoff prominences 171 and continuous standoff prominence 172 extends outwardly from inner side 122 of cap 110 at flange 125 a distance equal to compressed thickness T2 of gasket 112 being standoff distance D of approximately 60 thousandths of an inch. Based on the compressed thickness T2 of gasket 112, it is to be understood that the standoff distance of standoff structure 170 relative to inner side 122 of flange 125 of cap 110 is chosen in order to compress gasket 112 from its at-rest thickness T1 to its compressed thickness T2, which is a compressing distance equal to the difference between at-rest thickness T1 and compressed thickness T2, which is 30 thousandths of an inch in the present example of gasket 112 having an at-rest thickness of approximately 90 thousandths of an inch at a compressed thickness of approximately 60 thousandths of an inch.

Standoff prominences 171 are spacers in the form of protuberances or protuberant structures. Standoff prominences 171 are formed at seat 127. More specifically, standoff prominences 171 are formed in inner side 122 of cap 110 at flange 125 that receives gasket 112, and each project outwardly from inner side 122 of flange 125 of cap 110 and, thus, seat 127, to an outer end 171A a distance equal to standoff distance D. Standoff prominences 171 are equal in size and shape and are equally spaced-apart along the length flange 125 and thus seat 127 as best illustrated in FIG. 5. Standoff prominences are part of flange 125, and bolt holes 152 of flange 125 extend through standoff prominences 171. Standoff prominences 171 relate or otherwise correspond to bolt holes 151 of gasket 112, and standoff prominences 171 are sized to be received by and through bolt holes 151 of gasket 112.

Continuous standoff prominence 172 is formed in marginal edge 126 of flange 125, and, like standoff prominences 171, is a spacer in the form of a continuous protuberance or protuberant structure and is considered part of flange 125. Continuous standoff prominence 172 is a continuous sidewall formed in marginal edge 126 of flange 125 that encircles seat 127 and standoff prominences 171, and which projects outwardly from inner side 122 of flange 125 of cap 110, and thus seat 127, at marginal edge 126 of flange 125 to a continuous outer edge 172A a distance equal to standoff distance D.

With respect to the installation of cap assembly 100 in conjunction with standoff structure 170 of cap 110 with reference in relevant part to FIGS. 12-15, face 112A of gasket 112 is applied to and against open end 101A of roller 31, inner side 122 of cap 110 is directed toward open end 101A and inner side 122 of cap 110 at flange 125, namely, seat 127 of cap 110, is applied against face 112B of gasket 112 so as to apply gasket 112 directly against inner side of cap 110 at flange 125, namely, seat 127 of cap 110. In the application of gasket 112 to open end 101A and the application of cap 110 to gasket 112, bolt holes 151 of gasket 112 are aligned or otherwise registered with the bolt holes 154 formed in open end 101A of reservoir 101 and bolt holes 152 of flange 125 of cap 110 are, in turn, aligned or otherwise registered with bolt holes 151 formed gasket 112 and thus bolt holes 154 formed in open end 101A of reservoir 101. Standoff prominences 171 are, in turn, aligned with bolt holes 151 formed in gasket 112 and are initially received by or otherwise into the corresponding bolt holes 151 formed in gasket 112, and continuous standoff prominence 172 is received along the outer perimeter edge 112D of gasket 112. Gasket 112 received by seat 127 is located inside of, and is encircled by, continuous standoff prominence 172. At this point, gasket 112 sandwiched or otherwise applied between seat 127 of cap 110 and open end 101A of roller 31, and gasket 112 is at its at-rest thickness T1, which is greater than standoff distance D of standoff structure 170 and also compressed thickness T1 of gasket 112, and which separates cap 110 from open end 101A of roller 31 a distance equal to the difference between at-rest thickness T1 of gasket 112 and compressed thickness T2 of gasket 112 keeping cap 110 from directly contacting open end 101A of roller 31 as shown in FIGS. 12-15 defining the un-seated position of cap 110 relative to open end 101A of roller 31 in preparation for the installation of cap 110. Also, with standoff prominences 171 initially received by or otherwise into the corresponding bolt holes 151 of gasket 112, gasket 112 is initially keyed in place with respect to flange 125.

Bolts 150 are registered with the bolt holes 154 formed in open end 101A of roller 31 and with the aligned bolt holes 151 and 152 of gasket 112 and cap 110 of cap assembly 100 as shown in FIG. 12 and then bolts 150 are applied to bolt holes 154 via aligned bolt holes 151 and 152 and are threaded into bolt holes 154 formed in open end 101A of reservoir 101 and are then tightened down through rotation until heads 150A of bolts 150 are received against outer side 121 of cap 110 at flange 125 and then bolts 150 are further tightened through continued rotation, which draws heads 150A of bolts 150 against outer side 121 of cap 110 at flange 125. Bolts 150 are still further tightened through still continued rotation clamping or otherwise drawing bolts 150 inwardly toward roller 31 indicated by arrowed line B causing heads 150A of bolts 150 to forcibly act against outer side 121 of cap 110 at flange 125 drawing cap 110 inwardly toward open end 101A of roller in the same direction indicated by arrowed line B from the unseated position of cap 110 defining the at-rest thickness T1 of gasket 112 as shown in FIG. 12 to the seated position of cap 110 defining the compressed thickness T2 of gasket 112 as shown in FIG. 8 driving standoff prominences 171 through bolt holes of gasket 112 at which point outer ends 171A of standoff prominences 171 and continuous outer edge 172A of continuous standoff prominence 172 forming standoff structure 170 concurrently come into direct contact with open end 101A as shown in FIGS. 8-11 and bolts 150 are fully tightened.

The direct and concurrent contact of outer ends 171A of standoff prominences 171 and continuous outer edge 172A of continuous standoff prominence 172 to open end 101A of roller 31 is or otherwise defines the seated position of cap 110 and constitutes a direct contact interaction of standoff structure 170 between cap 110 and open end 101A of roller 31 which holds cap 110 away from open end at the standoff distance D between inner side 122 of flange of cap 110, namely, seat 127, and outer ends 171A of standoff prominences 171 of flange 125 and continuous outer edge 172 of continuous standoff prominence 172 of flange 125 in direct contact with open end 101A of roller 31 limiting the compression of gasket 112 within standoff distance D between inner side 122 of flange 110 of cap 110, namely, seat 127, and open end 101A of roller 31 to compressed thickness T2 and preventing an over-compression of gasket 112 beyond its compressed thickness T2, according to the principle of the invention. At the point where the standoff structure 170 directly contacts open end 101A of roller 31, cap 110 is in its seated position with respect to open end 101A of roller 31 and the standoff distance D of standoff structure 170 of cap 110 is defined between inner side 122 of flange of cap 110, namely, seat 127, and outer ends 171A of standoff prominences 171 and continuous outer edge 172 of continuous standoff prominence 172 in direct contact with open end 101A of roller 31, and gasket 112 is compressed to its compressed thickness T2 within this standoff distance D between cap 110 and open end 101A of roller 31. In the seated position of cap 110, the standoff distance D is defined between open end 101A of roller 31 and inner side 122 of cap 110 at flange 125, namely, seat 127, and the interaction of standoff structure 170 between cap 110 and open end 101A of roller 31 spacing cap 110 with respect to open end 101A of roller 31 so as to define standoff distance D between cap 110 and open end 101A of roller 31 isolates the compression of gasket 112 within the standoff distance D between seat 127 of cap 110 and open end 101A of roller 31 to its compression thickness T2 preventing compression of gasket 112 beyond its compression thickness T2, according to the principle of the invention. And so through the application of bolts 150 as explained above, bolts 150 are used to displace cap 110 from its un-seated position relative to open end 101A of roller 31 to its seated position relative to open end 101A of roller 31 concurrently compressing gasket 112 between seat 127 of cap 110 and open end 101A of roller 31 from its at-rest thickness T1 referenced in FIGS. 12-15 to its compressed thickness T2 referenced in FIGS. 8-11. The equally spaced-apart arrangement of standoff prominences 171 define equally spaced-apart standoff points along the length of gasket 112 forming an equally spaced-apart standoff distribution along the length of gasket 112 to ensure a substantially uniform compression of gasket 112 into its compressed thickness T2 along the length of flange 125 and, thus, along the length of gasket 112. The direct contact of continuous outer edge 172A of continuous standoff prominence 172 is a continuous contact, which defines a continuous contact of continuous standoff prominence 172 with open end 101A end of roller 31 that provides a continuous standoff point of standoff structure 170.

As explained above, the standoff distance of standoff structure 170 relative to inner side 122 of flange 125 of cap 110 is chosen to be the compressed thickness of gasket 112 as explained above. Gasket 112 and its at-rest thickness T1 and its compressed thickness T2 is set forth as a matter of illustration and reference, and it is to be understood that cap assembly 100 can be used with sealing gaskets having different at-rest and compressed thicknesses, in which case the standoff distance of standoff structure 170 is chosen and provided to relate to the compressed thickness T2 of the chosen sealing gasket, in accordance with the principle of the invention.

In this disclosure, the preferred fastening structure for removably securing or coupling cap 110 to open end 101A of roller 31 consists of fasteners in the form of bolts 150. Other fastening structures for facilitating the removable coupling or securing of cap 110 to the open end of a roller as is known in the art can be used consistent with the teachings of the present invention.

Standoff prominences 171 and continuous standoff prominence 172 form standoff structure 170 and provide redundancy to ensure that gasket 112 is compressed to its compressed thickness T2 and is held in its compressed thickness T2 in the seated position of cap 100. However, standoff prominences 171 work equally well independently of continuous standoff prominence 172, and continuous standoff prominence 172 works equally well independently of standoff prominences 171. If desired, standoff structure 170 of cap 110 may incorporate just standoff prominences 171 in one embodiment. In another embodiment, standoff structure 170 may incorporate just continuous standoff prominence 172.

The invention has been described above with reference to preferred embodiments. However, those skilled in the art will recognize that changes and modifications may be made to the embodiments without departing from the nature and scope of the invention. Various changes and modifications to the embodiment herein chosen for purposes of illustration will readily occur to those skilled in the art. To the extent that such modifications and variations do not depart from the spirit of the invention, they are intended to be included within the scope thereof.

Having fully described the invention in such clear and concise terms as to enable those skilled in the art to understand and practice the same, the invention claimed is:

1. An apparatus, comprising:
    a cap including an outer side, and an inner side having a standoff structure;
    a compressible gasket applied to the inner side of the cap;
    the standoff structure for interacting between the cap and an open end of a reservoir for holding the cap away from the open end of the reservoir for limiting compression of the gasket between the cap and the open end of the reservoir;
    the standoff structure comprises standoff prominences each for being in direct contact with the open end of the reservoir; and
    the gasket has a length and the standoff prominences form an equally spaced-apart standoff distribution along the length of the gasket.

2. The apparatus according to claim 1, wherein the standoff prominences are equal in size and are equally spaced-apart along the length of the gasket.

3. An apparatus, comprising:
    a cap including an outer side, and an inner having a recessed gasket seat and a standoff structure;
    a compressible gasket applied to the recessed gasket seat;
    the standoff structure for interacting between the cap and an open end of a reservoir for holding the cap away from the open end of the reservoir for limiting compression of the gasket between the recessed gasket seat and the open end of the reservoir; and
    the standoff structure comprises standoff prominences formed in the recessed gasket seat and the standoff prominences extend through the gasket and are for being in direct contact with the open end of the reservoir for holding the cap away from the open end of the reservoir for limiting compression of the gasket between the recessed gasket seat and the open end of the reservoir.

4. The apparatus according to claim 3, wherein the gasket has a length and the standoff prominences are spaced-apart along the length of the gasket.

5. The apparatus according to claim 3, wherein the standoff prominences are equal in size.

* * * * *